United States Patent Office 3,461,200
Patented Aug. 12, 1969

3,461,200
PROCESS FOR THE RECOVERY OF POLYARTHRITIS ANTIGEN
Hartwig Mathies, Haselweg 3, Ottobrunn, near Munich, Germany
No Drawing. Continuation-in-part of application Ser. No. 300,182, Aug. 6, 1963. This application Aug. 17, 1966, Ser. No. 572,928
Claims priority, application Germany, Aug. 14, 1962, M 53,892
Int. Cl. A61k 23/00
U.S. Cl. 424—101    7 Claims

ABSTRACT OF THE DISCLOSURE

A process is provided for recovering RA-factor from serum in which γ-globulin RA-factor agglutinate, precipitated by means of a flocculating agent, is treated by means of a pharmaceutically acceptable buffer solution of pH ranging from about 7.8 to 9.1 at a temperature of about 62° C. to 66° C. for a time sufficient to form a supernatant solution containing said RA-factor without substantially adversely affecting its activity. The solution is separated from the precipitate by centrifuging, while the solution is maintained at the temperature, the RA-factor then being recovered from the supernatant solution.

---

This invention which relates to a process for recovering polyarthritis antigen from serum in substantially the pure state is a continuation in part of U.S. Ser. No. 300,182, filed Aug. 6, 1963, now abandoned.

Serum from patients afflicted with rheumatoid arthritis contains a rheumatoid arthritis factor (RA-factor) involving certain globulins. It is known that the addition of a patient's serum to a suspension of flocculating agents loaded with γ-globulin, such as particles of latex, bentonite, or other flocculants, causes agglutination to occur between γ-globulin and the rheumatoid arthritis factor or antigen, whereby the agglutinate is precipitated together with the flocculating agent, which is taken as indicative of the reaction.

By centrifuging the solution, the precipitate is segregated therefrom and the solution, containing little or no rheumatoid arthritis factor is thereafter removed by decanting or other suitable method. The precipitate containing the γ-globulin-RA-factor agglutinate and the flocculating agent is then subjected to washing and centrifuging with a cold buffer solution or other suitable liquid. The process of centrifuging and washing is repeated several times, the wash solution removed from the precipitate being discarded.

The precipitate or sediment remaining from the final washing treatment contains the RA-factor bound to the globulin with which the particles of the flocculating agent are laden. It would be desirable to recover the RA-factor from the γ-globulin in substantially the pure state, the recovered RA-factor having utility in serological experiment, especially analyses.

It is thus the object of my invention to provide a method for recovering RA-factor from serum.

Another object is to provide a method for producing RA-factor in substantially the pure state.

These and other objects will more clearly appear from the following disclosure and the appended claims.

I have now discovered that I can recover RA-factor in substantially the pure state by taking the γ-globulin-RA-factor agglutinate precipitated by a pharmaceutically acceptable flocculating agent and treating it with a buffer solution at a temperature within the range of about 62–66° C., preferably 65° C., whereby the rheumatoid arthritis factor is separated from the γ-globulin precipitate. According to precipitation studies reported by Epstein and Ross in "Arthritis and Rheumatism" (vol. 4, No. 5, pp. 480–489, 1961), heating of rheumatoid serum to, for example, 56° C. for 30 minutes tends to reduce the ability of the serum to form a precipitate. However, I start with the precipitate itself previously prepared under controlled conditions as I have found that the rheumatoid factor-gamma (γ) globulin complex in the agglutinate is more thermally stable at elevated temperatures than the rheumatoid factor alone and can be treated to recover the rheumatoid factor alone without substantially adversely affecting its activity. It has been found that the temperature of treatment is important in that the buffer solution must be maintained at the specified temperature during the treatment and separated from the precipitate while at that temperature; otherwise, if the supernatant solution is allowed to cool to below the required temperature while in contact with the precipitate, the antigen tends to bind itself to the γ-globulin in the precipitate. The time of treatment in the buffer solution should be sufficient to enable the rheumatoid factor to split off from the complex while preserving its activity. For the purposes of this invention, it has been found that the time of treatment for separating the rheumatoid factor from the complex may range up to about 12 or 15 minutes.

In its broad aspects the invention comprises a method for recovering RA-factor from serum comprising, providing a γ-globulin-RA-factor agglutinate precipitated by means of a flocculating agent, suspending the globulin-RA-factor precipitate in the pharmaceutically acceptable buffer solution maintained at a temperature of about 65° C., whereby to form a supernatant solution containing the RA-factor, separating the supernatant solution from the precipitate while maintaining the solution at the aforementioned temperature, and then recovering the RA-factor from the supernatant solution.

The heated pharmaceutically acceptable buffer solutions in which the washed precipitate is suspended include those which have a pH of 7.8 to 9.1, preferably from about 8.1 to 8.7, for example, 8.2. Examples of such solutions are glycine saline buffer solutions, physiological saline solutions and the like. The solution containing the suspended precipitate is warmed in a water bath at a temperature of about 62–66° C., preferably 65° C., and then centrifuged at constant temperature in a heated chamber or water bath. Centrifuging in a water bath may be effected by placing the reaction vessel in another larger vessel containing warm water controlled at a specified temperature, the host vessel and the reaction vessel each being adequately closed or sealed.

Upon completion of the centirfuging step, the supernatant solution at the specified temperature is pipetted or decanted into a fresh vessel. Once the supernatant solution with the contained antigen has been separated from the precipitate, it can be cooled to below the treating temperature without any risk to the contained RA-factor. Where the buffer solution is a saline solution, salt free RA-factor is recovered by dialysis in the manner well known in the art.

It will be apparent from the foregoing disclosure that a unique method is provided for the recovery of rheumatoid arthritis factor. As has been stated, any pharmaceutically acceptable flocculating agent may be employed in preparing the globulin-RA-factor agglutinate precipitate. I have found particles of latex, bentonite, quartz, collodion, mastic, dispersed polyacrylic compound and the like agents, to be particularly preferred. Likewise, any pharmaceutically acceptable buffer solution selective to the removal of the RA-factor from the precipitate may be employed to separate the antigen from the γ-globulin so long as the pH of the solution ranges from 7.8 to 9.1.

Example

In accordance with the method of the invention, 2 ml. glycine-saline-buffer-solution (Hyland Laboratories) are mixed with 0.2 ml. of a rheumatoid serum with high titer and 2.0 latex-γ-globulin-suspension (Hyland Laboratories) in a centrifuging vessel and the mix maintained for 30 minutes in the incubator at a temperature of 37° C., and shaked up in the meantime several times. Subsequently it is centrifuged at 2,000 r.p.m. for 7 minutes, whereby supernatant solution is segregated. The sediment is washed twice with an ice-cold buffer solution and the supernatant solution is segregated and discarded after the last centrifuging. The sediment is then suspended in 1.5 ml. buffer solution and is heated in a water bath for about 12 minutes at a temperature of 65° C., the mixture being agitated in the meantime. Immediately subsequent thereto it is centrifuged at 1,500 r.p.m. for 3 minutes at a temperature of 65° C. The supernatant solution is segregated. It contained the RA-factor in high concentration, as may be examined by titration in the drop test. By dialysis against aqua dest. and silica gel and freeze-drying a good purification and concentration is effected.

Tests have indicated that the RA-factor recovered in accordance with the method of the invention retains its activity. In carrying out such tests, the following materials, reagents and devices are employed:

(a) RA-factor positive serum of high titer from patients afflicted with rheumatoid arthritis;

(b) A suspension of gamma-globulin (Cohn fraction II) and loaded latex particles (commercial reagent of Hyland Laboratories, Los Angeles);

(c) A glycine saline buffer solution pH 8.2 (commercial reagent of Hyland Laboratories, Los Angeles);

(d) A water bath with thermostat and stirrer; and (e) A centrifuge with heat insulated pre-heated insets. Microporous polystyrene was used as an insulating material. The device operated at 2,000 r.p.m.

In carrying out the test, one part of a serum from patients afflicted with rheumatoid arthritis of high titer together with 10 parts glycine saline buffer solution and 10 parts of a suspension of gamma-globulin loaded latex particles were placed into a centrifuge beaker and after shaking incubated in an incubator at 37° C. for 30 minutes. Thereafter, it wase centrifuged at 2,000 r.p.m. for 7 minutes, the supernatant liquid siphoned off and discarded. The precipitate was washed several times with ice-cold buffer solution and after the last washing step suspended into a buffer solution of ¾ of the starting volume (taking into consideration a loss of material of about 25%). The suspension was heated at 63° C. in a water bath for up to 10 minutes and shaken several times. Immediately afterwards, it was centrifuged at 63° C. and 2,000 r.p.m. for 3 minutes. The supernatant solution was siphoned off at once when it was still warm and contained the RA-factor split off from the gamma-globulin.

By the agglutination test the loss of titer can be determined which is small compared with the starting material. The tests were carried out with 11 different samples of serum. After isolation, the titer of the RA-factor contatined in the buffer solution is determined in the usual RA-test (latex drop test: a drop of latex loaded with gamma-globulin is placed upon an object slide and the isolated RA-factor is added thereto dissolved in buffer solution of varying concentrations). A comparison with the starting titer of the serum shows that active material has been isolated and allows the determination of the loss of titer caused by the isolation procedure.

The results of the test showed that the isolated RA-factor is active in the agglutination test, even though a certain loss of titer may occur.

Although the present invention has been described in conjunction with preferred embodiments, it is to be understood that modification and variations may be resorted to without departing from the spirit and scope of the invention, as those skilled in the art will readily understand. Such modifications and variations considered to be within the purview and scope of the invention and appended claims.

What is claimed is:

1. A process for recovering RA-factor from serum which comprises, providing a γ-globulin RA-factor agglutinate precipitated by means of a flocculating agent in the form of particles selected from the group consisting of latex, bentonite, quartz, collodion, and mastic, suspending the γ-globulin RA-factor agglutinate precipitate in a pharmaceutically acceptable buffer solution of pH ranging from about 7.8 to 9.1 maintained at a temperature of about 62 to 66° C. for a time sufficient to form a supernatant solution containing said RA-factor without substantially adversely affecting its activity, separating said supernatant solution from said precipitate by centrifuging while maintaining said solution at said temperature, and then recovering the RA-factor from said supernatant solution.

2. The method of claim 1 wherein the buffer solution is a physiological saline solution.

3. The method of claim 2 wherein the physiological saline solution is a glycine saline solution.

4. The method of claim 1 wherein the time of treatment of the precipitate in the buffer solution ranges up to about 15 minutes.

5. The method of claim 4 wherein the temperature of the buffer solution is about 65° C.

6. The method of claim 1 wherein latex is employed as the flocculating agent.

7. The method of claim 1 wherein the RA-factor recovered from the supernatant solution is subjected to freeze drying.

References Cited

Epstein et al., Arthritis and Rheumatism, vol. 4, No. 5, pp. 480–489, 1961.

Mathies et al., Zeitschrift fuer Rheumaforschung, vol. 22, No. 5/6, May-June 1963.

RICHARD L. HUFF, Primary Examiner

U.S. Cl. X.R.

424—12, 85, 88